United States Patent [19]

Hennig et al.

[11] Patent Number: 5,010,150

[45] Date of Patent: Apr. 23, 1991

[54] CONTROLLING THE PARTICLE SIZE IN THE PREPARATION OF POLYMER POWDERS

[75] Inventors: Karl Hennig, Hessheim; Heinrich Hartmann, Limburgerhof; Hans-Juergen Raubenheimer, Ketsch, all of Fed. Rep. of Germany

[73] Assignee: BASF Aktiengesellschaft, Ludwigshafen, Fed. Rep. of Germany

[21] Appl. No.: 434,183

[22] Filed: Nov. 13, 1989

[30] Foreign Application Priority Data

Dec. 15, 1988 [DE] Fed. Rep. of Germany ....... 3842184

[51] Int. Cl.$^5$ .......................... C08F 2/34; C08J 3/12
[52] U.S. Cl. .......................................... 526/88; 264/5; 264/12
[58] Field of Search .................. 526/88; 264/5, 12

[56] References Cited

U.S. PATENT DOCUMENTS 4,135,043  1/1979  Kast et al. ........................... 526/88

FOREIGN PATENT DOCUMENTS 1194648  10/1985  Canada .
3009812   3/1980  Fed. Rep. of Germany .
61-24626 12/1983  Japan .
667225    6/1975  U.S.S.R. .

Primary Examiner—Joseph L. Schofer
Assistant Examiner—Tom Weber
Attorney, Agent, or Firm—Oblon, Spivak, McClelland, Maier & Neustadt

[57] ABSTRACT

The particle size is controlled in the preparation of hydrophilic polymer powders by polymerization of water-soluble monoethylenically unsaturated monomers in a powder bed in the presence of a polymerization initiator and an inert auxiliary liquid by a method in which a solution of the monomers in an inert auxiliary liquid is divided into fine drops with the aid of a multimaterial nozzle which dips into the powder bed, using an inert gas stream, and the particle size of the resulting polymer powder is regulated by varying the amount of inert gas.

1 Claim, No Drawings

CONTROLLING THE PARTICLE SIZE IN THE PREPARATION OF POLYMER POWDERS

U.S. Pat. No. 4,135,043 discloses a process for the preparation of water-soluble polymer powders, in which water-soluble ethylenically unsaturated monomers are polymerized in a powder bed in the presence of a conventional polymerization initiator and water as an auxiliary liquid, while maintaining the powder state, removing the heat of polymerization by distilling off water and circulating the reaction material.

Canadian Patent 1,194,648 likewise discloses a process for the preparation of polymer powders by polymerization of the monomers in a powder bed, in which inert organic solvents which constitute a precipitating agent for the polymers are used for removing the heat of polymerization.

European Patent 0,113,048 discloses a process for the preparation of polymer powders based on water-soluble ethylenically unsaturated monomers in a powder bed. The monomers, in the form of an aqueous solution or dissolved in a water/isopropanol mixture, are polymerized in the presence of a conventional polymerization initiator while maintaining the powder state, removing the heat of polymerization by distilling off the solvent and circulating the reaction material, from 40 to 95% of the acid groups of the monomers being neutralized and the polymerization additionally being carried out in the presence of a polymerization regulator, such as a thiocarboxylic acid or 2-mercaptoethanol. In the processes, described above, for the preparation of polymer powders in a powder bed, the powders obtained have a relatively wide particle size distribution, for example in the range from 10 µm to 20 mm. In most cases, it is therefore essential to comminute the resulting products to the desired particle size and then to screen the comminuted material.

It is an object of the present invention to control the particle size of polymer powders during polymerization of water-soluble monoethylenically unsaturated monomers in a powder bed, in such a way that powders which are as dust-free as possible and have a narrow particle size distribution are obtained, so that the otherwise usual comminution and screening of the polymers after the polymerization can be dispensed with.

We have found that this object is achieved, according to the invention, by a process for controlling the particle size during the preparation of hydrophilic polymer powders by polymerization of water-soluble monoethylenically unsaturated monomers in a powder bed in the presence of a polymerization initiator and an inert auxiliary liquid while maintaining the powder state, removing the heat of polymerization by distilling off the auxiliary liquid and circulating the reaction material, if a solution of the monomers in an inert auxiliary liquid is divided into fine drops with the aid of a multimaterial nozzle which dips into the powder bed, using an inert gas stream, and the particle size of the resulting polymer powder is controlled by varying the amount of inert gas. From 10 to 100 l of inert gas per liter of monomer solution are required for dividing up the monomer solution with the aid of multimaterial nozzles.

Suitable water-soluble monoethylenically unsaturated monomers are, for example, ethylenically unsaturated $C_3$–$C_5$-monocarboxylic acids, dicarboxylic acids and carboxylic anhydrides, such as acrylic acid, methacrylic acid, maleic acid, maleic anhydride, itaconic anhydride, fumaric acid and itaconic acid, amides of ethylenically unsaturated carboxylic acids, in particular acrylamide and methacrylamide, and basic acrylamides and methacrylamides, such as di-$C_1$–$C_3$-alkylamino-$C_2$–$C_4$-alkylacrylamides and the corresponding methacrylamides, such as aminoalkylacrylamides or aminoalkylmethacrylamides, e.g. dimethylaminomethylacrylamide, dimethylaminoethylacrylamide, aminoethylacrylamide, aminoethylmethacrylamide, diethylaminoethylacrylamide and diethylaminoethylmethacrylamide, esters of ethylenically unsaturated $C_3$–$C_5$-carboxylic acids with amino alcohols, e.g. dimethylaminoethyl acrylate, dimethylaminoethyl methacrylate, diethylaminoethyl acrylate, diethylaminoethyl methacrylate, dimethylamino-n-propyl acrylate, dimethyl-n-propyl methacrylate, dimethylaminoneopentyl acrylate and dimethylaminoneopentyl methacrylate, N-vinylpyrrolidone and substituted N-vinylpyrrolidones, N-vinylimidazole and substituted N-vinylimidazoles, such as 1-vinyl-2-methylimidazole, N-vinylimidazoline and substituted N-vinylimidazolines, such as 1-vinyl-2-methylimidazoline, vinylsulfonic acid, acrylamidomethylpropanesulfonic acids and N-vinylformamide. Those monomers which contain a carboxyl group or a sulfo group can be used in the form of the free acid groups or in partially or completely neutralized form. Neutralization is carried out using alkali metal bases, ammonia, substituted ammonium compounds or alkaline earth metal bases. The monomers containing acid groups are preferably neutralized with sodium hydroxide solution, potassium hydroxide solution, ammonia or alkanolamines. The basic monomers, such as dialkylaminoethyl acrylates and methacrylates, are subjected to the polymerization in the form of the free bases or, preferably, in salt form, i.e. after neutralization with inorganic or organic acids.

Preferably, the salts used are the chlorides or sulfates. In addition, these monomers can be polymerized in quatenary form.

The abovementioned water-soluble monoethylenically unsaturated monomers can be polymerized either alone or as a mixture with one another. Thus, powder homopolymers of acylic acid, methacrylic acid, acrylamide and N-vinylformamide can be prepared, for example, by this process. The preparation of copolymers of water-soluble monomers is also of industrial interest, and, for example, the following polymer powders can be readily prepared: copolymers of acrylic acid and maleic acid, copolymers of acrylic acid and methacrylic acid, copolymers of acrylic acid and acrylamide, copolymers of acrylic acid and itaconic acid, copolymers of acrylamide and methacrylic acid, copolymers of acrylamide and itaconic acid, copolymers of acrylamide, acrylic acid and dimethylaminoethyl acrylate and copolymers of acrylic acid and/or methacrylic acid and vinylsulfonic acid or their sodium, potassium or ammonium salts. The copolymers described above may contain the monomers in any ratio as copolymerized units.

The copolymerization can, however, also be carried out in the presence of other monoethylenically unsaturated monomers which are insoluble in water or have only very low solubility in water. This group of monomers, which can be used for modifying the hydrophilic polymers described above, is, however, used in the copolymerization in an amount such that the resulting copolymers are still soluble in water. For example, amounts of not more than 50% by weight, based on the total amount of monomers used in the polymerization are suitable for this purpose. This group of monomers includes, for example, esters of monoethylenically unsaturated carboxylic acids and saturated $C_1$–$C_8$-alcohols, such as methyl acrylate, methyl methacrylate, ethyl acrylate, ethyl methacrylate, isobutyl acrylate, isobutyl methacrylate, 2-ethylhexyl acrylate and 2-ethylhexyl methacrylate, vinyl esters, such as vinyl acetate, vinyl propionate, vinyl butyrate, vinyl ethers, such as methyl vinyl ether, ethyl vinyl ether, propyl vinyl ether and butyl vinyl ether, and acrylonitrile and methacrylonitrile.

The copolymerization may furthermore be carried out in the presence of small amounts of another group of monomers which contain two or more ethylenically unsaturated double bonds. Suitable compounds of this type are, for example, N,N'-methylenebisacrylamide, polyethylene glycol acrylates and polyethylene glycol dimethacrylates, each of which is derived from a polyethylene glycol having a molecular weight of from 106 to 4,000, trimethylolpropane triacrylate, trimethylolpropane trimethacrylate, ethylglycol diacrylate, propylene glycol diacrylate, butanediol diacrylate, hexanediol diacrylate, hexanediol dimethacrylate, diacrylates and dimethacrylates of block copolymers of ethylene oxide and propylene oxide having molecular weights of up to 3,000, adducts of ethylene oxide and/or propylene oxide with trimethylolpropane, which adducts are diesterified or triesterified with acrylic acid or methacrylic acid, polyhydric alcohols, such as glycerol, which are diesterified or polyesterified with acrylic acid or methacrylic acid, polyglycerol having a molecular weight of up to 2,000 or pentaerythritol, triallylamine, tetraallylethylenediamine, divinylbenzene, diallyl phthalate, polyethylene glycol divinyl ether, trimethylolpropane diallyl ether, butanediol divinyl ether, pentaerythritol triallyl ether and/or divinylethyleneurea. From this group of monomers, N,N'-methylenebisacrylamide, polyethylene glycol diacrylate, polyethylene glycol dimethacrylate and pentaerythritol triallyl ether are preferably used. If the monomers of this group are used in the copolymerization, they are employed in amounts of from 0.01 to 5, preferably from 0.1 to 2%, by weight, based on the total monomers. These monomers affect crosslinking of the polymers and result in the polymers formed no longer being water-soluble but swellable in water. Such polymers can absorb considerable amounts of water and are therefore used as water-absorbing materials.

Both low molecular weight polymers and very high molecular weight polymers can be prepared by the process of fixed bed polymerization. The K values of these polymers are from 20 to about 300 (determined according to H. Fikentscher in 1% strength aqueous solution at 25° C.).

Virtually all solvents which are inert under the polymerization conditions and which do not react markedly with the substances present during the polymerization can be used as the inert auxiliary liquid. However, such solvents can affect the molecular weight of the resulting polymers because they can act as regulators to a greater or lesser extent. In the preparation of low molecular weight polymers, this is, however, a desirable effect. For example, alcohols have regulating properties. Examples of suitable inert auxiliary liquid are ketones, such as acetone or methyl ethyl ketone, saturated aliphatic hydrocarbons, such as pentane, hexane, heptane, octane or isooctane, and cyclic aliphatic hydrocarbons, such as cyclohexane or decalin, and mixtures of the stated aliphatic hydrocarbons, aromatic hydrocarbons, such as benzene, toluene and xylene, halohydrocarbons, such as 1,1,2-trichloro-1,2,2-trifluoroethane, carbon tetrachloride, trichlorofluoromethane and hexachloroethane, ethers, such as methyl tert-butyl ether, tetrahydrofuran and dioxane, esters, such as methyl acetate and ethyl acetate, alcohols, such as saturated monohydric $C_1$–$C_8$-alcohols, dimethylformamide and water. Preferred inert solvents are water and monohydric $C_1$–$C_6$-alcohols, e.g. methanol, ethanol, n-propanol, isopropanol, n-butanol, isobutanol, tert-butanol and cyclohexanol. In addition, acetone, n-hexane, cyclohexane and methyl tert-butyl ether are frequently used solvents and are suitable. It is of course also possible to use mixtures of the stated solvents. Water cannot be used when anhydrides, such as maleic anhydride, are employed as monomers in the polymerization. In these cases, the inert auxiliary used is, for example, acetone. The boiling point of the suitable inert auxiliary liquids is not more than 190° C., preferably from 20° to 150° C., under 1,013 mbar.

For the polymerization, the monomers are dissolved in an inert auxiliary liquid or in a mixture of inert auxiliary liquids. The monomer concentration is from 30 to 70, preferably from 45 to 60%, by weight.

The polymerization is carried out in the presence of a polymerization initiator. The polymerization initiators can be fed to the powder bed either separately from the monomer solution or, preferably, together with the monomer solution. Preferred polymerization initiators are water-soluble or water-emulsifiable hydroperoxides, peroxides, peroxydisulfates, hydrogen peroxide or redox catalyst systems and azo compounds. Hydrogen peroxide, sodium peroxydisulfate, potassium peroxydisulfate, ammonium peroxydisulfate and water-soluble azo compounds, such as 2,2'-azobis-(2-amidinopropane) hydrochloride, are preferably used. From 1 to 20, preferably from 5 to 10%, by weight, based on the monomers used in the polymerization, of an initiator are used. The amounts of initiator depend on the molecular weight of the polymers to be prepared. If polymers having a particularly low molecular weight are prepared, larger amounts of initiators are used. In these cases, the polymerization is furthermore preferably carried out in the presence of polymerization regulators.

Examples of suitable polymerization regulators are mercapto alcohols, such as 2-mercaptoethanol, mercaptopropanol, mercaptobutanols and mercaptohexanol, thioglycollic acid, thiolactic acid, 3-mercaptopropionic acid, 2-mercaptobutyric acid, 3-mercaptobutyric acid and 3-mercaptosuccinic acid, and mercaptans, such as dodecyl mercaptan, aldehydes, such as formaldehyde, acetaldehyde, propionaldehyde and butyraldehydes, formic acid, ammonium formate, hydroxylammonium salts, in particular hydroxylammonium sulfate, and propionic acid. Other suitable polymerization initiators are enol ethers and salts or chelates of copper and of transition metals of subgroup 8 of the Periodic Table, for example copper nitrate, copper sulfate, copper acetate, iron sulfate, iron nitrate, manganese sulfate, manganese(III) acetate, cobalt nitrate and nickel nitrate. If regulators are used for the polymerization, the amounts are from 0.1 to 10, preferably from 3 to 6%, by weight. The preferably used regulators are thioglycollic acid and 2-mercaptoethanol. The regulators are preferably introduced together with the monomer solution into the polymerization zone but may also be added to the powder bed separately from the monomers.

In order to polymerize the monomers in a powder bed, a powder material must be initially taken, as is usual in the known processes. This may be an inert inorganic powder or polymer powders. Such a polymer powder may be, for example, a polymer prepared by a known method. Preferably, a polymer powder essentially corresponds to the composition of the polymer to be prepared is initially taken. For example, for the preparation of low molecular weight polymers of acrylic acid, a polyacrylic acid powder obtainable by polymerization of acrylic acid in isopropanol or a mixture of isopropanol and water by the process described in U.S. Pat. No. 4,301,266 can initially be taken in the reactor. However, for this purpose it is necessary first to remove the solvents used in the solution polymerization of the acrylic acid and to isolate the polymer powder. However, it is also possible initially to take another polymer, for example polyacrylamide powder, in the reactor and then to polymerize acrylic acid. When the polymerization reactor is operated by a continuous method, the initially taken polyacrylamide is then gradually removed until finally pure polyacrylic acid powder is discharged. The particle size of the initially taken powder is from 0.5 to 5 mm, preferably from 1 to 3 mm.

Suitable polymerization apparatuses are, for example, kettles, stirred autoclaves, combinations of stirred kettles with a downstream flow tube or cascades of stirred kettles or stirred autoclaves. The powder material initially taken in the polymerization apparatus is heated to the polymerization temperature while being circulated. The polymerization of the monomers can be carried out within a wide temperature range, for example from 30° to 180° C., preferably from 120° to 150° C. The temperature during the polymerization should be 10° C. or more below the melting point or the beginning of the melting range of the polymer, so that the individual polymer particles do not stick to one another. The temperature must of course be sufficiently high for the particular inert liquid or mixture of inert liquids used to be evaporated from the polymerization zone. The polymerization can be carried out under atmospheric pressure, reduced pressure or superatmospheric pressure, for example up to 25 bar. Virtually the only suitable method for production is a continuous preparation of the polymers. If only small amounts of polymer powders are to be prepared, the polymerization can also be carried out batchwise. In continuous operation, the monomer solution is fed continuously or at intervals to the reaction zone and the polymer is removed from the said zone continuously or likewise at intervals with the aid of a suitable discharge apparatus, for example a screw. About the same amount of polymer is removed per unit time as the amount of monomers introduced into the reaction zone, so that a steady state is reached.

The essential feature of the present invention is that a solution of the monomers in the inert auxiliary liquid is divided into fine drops by an inert gas stream with the aid of a multimaterial nozzle which dips into the powder bed. The particle size of these drops is correlated with the particle size of the resulting polymer powders. The amount of inert gas used for dividing up the solution of the monomers in the inert auxiliary liquid is from 10 to 100 l of inert gas per l of monomer solution. The size of the drops of the solution of the monomers in the inert auxiliary liquids can also be varied by changing the nozzle orifice diameters. However, the particle size of the monomers to be polymerized in the auxiliary liquid is most simply controlled by means of the amount of inert gas. The nozzle orifice diameter are from 0.5 to 6 mm, preferably from 0.7 to 2 mm.

In the simplest case, the solution of the monomers in the inert auxiliary liquid is divided into fine drops with the aid of a two-material nozzle inside the powder bed by an inert gas stream. The two-material nozzle consists of, for example, 2 concentrically arranged annular orifices. The monomer solution can be introduced into the powder bed through the inner or through the outer orifice. Preferably, the solution of the monomers in the inert auxiliary liquids is passed through the inner nozzle orifice and an inert gas stream is passed through the outer nozzle orifice. Preferred inert gases are nitrogen and carbon dioxide.

If the monomers to be polymerized are to be neutralized during the polymerization, it is advisable to use a three-material nozzle, by means of which the solution of the monomers in the auxiliary liquids, the neutralizing agent and the inert gas stream are introduced into the polymerization zone separately from one another. The three-material nozzle essentially consists of 3 concentric orifices through which the product streams are introduced into the reactor. The inert gas, for example nitrogen, is preferably passed through the outer annular gap of the three-material nozzle. Either the monomer solution or the neutralizing agent can be fed through the inner gap. It is of course possible to feed the product streams through the three-material nozzle in a different order. When the multimaterial nozzle is used, for example, the monomers dissolved in the inert auxiliary liquids are mixed with the neutralizing agent outside the actual nozzle and divided into fine drops directly with the aid of the nitrogen stream. The heat of neutralization and heat of polymerization are each removed by evaporating the inert auxiliary liquids from the system. The temperatures are always kept in a range such that the powder state is maintained in the reactor. During the polymerization, the auxiliary liquids are distilled off from the system and the reactants are circulated continuously in the reactor, for example are kept in motion with the aid of a stirrer. The solution of the monomers in the inert auxiliary liquids can be introduced with the aid of a single multimaterial nozzle or with the aid of a plurality of such nozzles, each of which dips into the powder bed and also end therein during the polymerization.

The polymerization initiators are advantageously introduced into the polymerization zone together with the solution of the monomers in the auxiliary liquids. The said solution may also contain any polymerization regulators to be used, in addition to the polymerization initiator. If popcorn polymers are also to be prepared by polymerization in the powder bed, the procedure is carried out in the absence of polymerization initiators and, as is usual in the case of popcorn polymerization, a monoethylenically unsaturated compound, e.g. N-vinylpyrrolidone, is copolymerized together with a compound having two or more double bonds. Processes of this type are disclosed in, for example, EP-A-175 335 and EP-A-177 812. For the preparation of this class of polymers too, it is possible to regulate the particle size of the popcorn polymers by means of the amount of inert gas which is used for dividing up the solution of the monomers in the auxiliary liquid.

In the case of the polymerization of water-soluble monoethylenically unsaturated monomers containing acid groups, for example acrylic acid or methacrylic acid, the polymerization is preferably carried out in such a way that partial neutralization of the carboxylic acid groups is effected during the polymerization. The heat of neutralization evolved during this procedure is then removed, together with the heat evolved during the polymerization and the heat generated by circulation of the polymer in the reaction vessel, by evaporating the inert auxiliary liquids from the polymerization zone. The neutralization of the acid groups of the water-soluble monomers is preferably carried out to an extent of from 40 to 95%, in particular from 70 to 90%, during the polymerization. For the preparation of low molecular weight polymers of acrylic acid or methacrylic acid or copolymers of methacrylic acid and acrylic acid, for example, water or a mixture of water and isopropanol is used as the auxiliary liquid, the monomer solution is fed through the inner gap of the three-material nozzle, an aqueous sodium hydroxide solution through the middle gap and nitrogen through the outer gap of the three-material nozzle. The monomer solution may contain up to 30% by weight of vinylsulfonic acid, sodium vinylsulfonate, potassium vinylsulfonate or ammonium vinylsulfonate. For the preparation of particularly low molecular weight polymers of acrylic acid and copolymers of acrylic acid and vinylsulfonic acid or of methacrylic acid and vinylsulfonic acid, the polymerization is additionally carried out in the presence of regulators. In this case, the regulators are added to the monomer solution. For the preparation of particularly low molecular weight polymers of acrylic acid and methacrylic acid, mixtures of regulators, for example from 0.5 to 10 mol % of a thiocarboxylic acid and/or a mercapto alcohol and additionally from 0.05 to 10 mol % of propionic acid and/or formic acid, are preferably used. In the polymerization in a powder bed, this gives particularly low molecular weight polyacrylic acid powder. The K values of the low molecular weight polymers of acrylic acid or methacrylic acid are from 20 to 40 (determined according to H. Fikentscher in water at a polymer concentration of 1% by weight and at 25° C. and pH 7.0, as the sodium salt). The homopolymers of acrylic acid and methacrylic acid or the copolymers, for example copolymers of acrylic acid and vinylsulfonic acid or sodium vinylsulfonate or copolymers of methacrylic acid and vinylsulfonate, are used as milling assistants and/or dispersants in the preparation of aqueous suspensions of pigments for paper coating materials, in amounts of from 0.5 to 1, preferably from 0.3 to 0.6%, by weight, based on pigment. These polymers are also used in detergents, where they are employed as incrustation inhibitors. The amounts used for this purpose are from 0.5 to 10% by weight, based on the detergent.

For example, powder polymers of acrylamide having K values of up to 250 are obtainable by the novel process. Such high molecular weight polyacrylamides are used, for example, as retention aids and drainage aids in papermaking or for the treatment of industrial and communal wastewaters. They can also be used for dewatering sludges. Crosslinked copolymers of acrylic acid which have high water absorption are employed, for example, as a water-absorbing substance in diapers.

In the Examples, percentages are by weight. The K values were measured according to H. Fikentscher, Cellulosechemie, 13 (1932), 48–64 and 71–74, in 1% strength by weight aqueous solution at 25° C. and a pH of 7.0, on the Na salt of the polymers; $K = k \times 10^3$.

The Examples and Comparative Examples below were carried out using a 40 l polymerization kettle which was equipped with a helical ribbon impeller, descending condenser and a three-material nozzle which ended 15 cm below the surface of the initially taken polyacrylic acid powder. The gap widths of the concentric, annular three-material nozzle were:

Inner: 0.8 mm
Middle: 0.7 mm
Outer: 1.25 mm

A nitrogen line for carrying out the polymerization under a nitrogen atmosphere also entered the reactor. The pressure in the polymerization reactor was kept constant by means of a pressure control valve installed downstream of the descending condenser. The polymerization reactor was brought to the polymerization temperature with the aid of a steam-heated pressurised water circuit. A separator was arranged between the polymerization reactor and the descending condenser to retain any solids entrained by the nitrogen stream or by the evaporating boiling aid. To monitor the temperature of the powder, the polymerization reactor was equipped with a temperature measuring probe extending into the powder. To remove the polymer formed during the polymerization from the reactor, the reactor was provided on the side, in the upper third, with a discharge screw which discharged the powder material when the polymer reached a certain level in the kettle. The amount of polymer in the kettle is kept virtually constant by a continuous discharge during the polymerization. The collecting vessel into which the material was discharged could be decoupled from the polymerization kettle periodically by means of 2 shut-off elements, let down and emptied. In the apparatus described above, 20 kg of a granulated powder prepared by spray drying a solution polymer of acrylic acid and having a particle diameter of from 2 to 3 mm were initially taken and were heated, with thorough circulation, to the temperature stated in each of the Examples and Comparative Examples below.

EXAMPLE 1

5.2 kg/hour of acrylic acid, 0.8 kg/hour of water as an inert auxiliary liquid, 0.27 kg/hour of 2-mercaptoethanol and 0.96 kg/hour of 50% strength hydrogen peroxide are mixed continuously in a static mixer, and the mixture is fed to the inner gap of the three-material nozzle. An aqueous solution of 2,500 g/hour of sodium hydroxide and 2,500 g/hour of water is fed continuously to the middle gap of the three-material nozzle. A stream of 200 l/h of nitrogen is fed to the outer gap of the of the monomer solution, including the neutralizing agent. The polymerization temperature is 140° C. The reactor is brought to a pressure of 1.7 bar by forcing in nitrogen. During the polymerization, the powder is stirred and the powder state of the reaction mixture is maintained. The water fed in as the auxiliary liquid is distilled off continuously with the water liberated in the neutralization. The amount of condensate is 4.5 kg per hour. 7 kg/h of polymer are conveyed by the discharge screw from the polymerization kettle into the discharge vessel, in which the polymer is kept at 140° C. and 1.70 bar for 1 hour. Thereafter, the vessel is slowly let down and the particulate material is discharged. After a total polymerization time of 36 hours, corresponding to about 15 kettle throughputs, a sample of the discharged polymer is investigated. The 85% neutralized polyacrylic acid then has a residual monomer content of less than 1%, contains less than 1% of swollen particles and has a K value of 40.1 and the particle size distribution shown in the Table.

EXAMPLE 2

Example 1 is repeated with the exceptions that 4,900 g/hour of acrylic acid, 270 g/hour of 2-mercaptoethanol, 1,100 g/hour of a 25% strength aqueous solution of sodium vinylsulfonate in water and 960 g/hour of a 50% strength solution of hydrogen peroxide are fed to the static mixer. This monomer stream is introduced into the powder bed through the inner gap of the three-material nozzle, an aqueous solution of 2,080 g/hour of sodium hydroxide in 2,080 g/hour of water is passed through the middle gap of the concentric three-material nozzle and 200 l/hour of nitrogen are passed through the outer gap of the said nozzle. The orifice of the three-material nozzle is located about 10 cm below the surface of the powder. 16 l of nitrogen are required for dividing up one l of the monomer stream and of the aqueous sodium hydroxide solution. The polymerization was otherwise hydroxide solution. The polymerization was otherwise carried out under the conditions stated in Example 1. A fine-particled copolymer having a K value of 39.5 and a degree of neutralization of 90.5% is obtained. The particle size distribution is shown in the Table.

EXAMPLE 3

Example 1 is repeated with the exception that 500 l/h of nitrogen, corresponding to 40 l of nitrogen per l of monomer solution and of the aqueous sodium hydroxide solution used as the neutralizing agent, are passed through the outer annular gap of the nozzle. A fine-particled polymer having a K value of 39.8 and the particle size distribution shown in the Table is obtained.

COMPARATIVE EXAMPLE 1

Example 1 was repeated with the exception that the three-material nozzle is replaced by a one-material nozzle, which ends 15 cm above the powder polymer in the reactor. The monomer stream arriving from the static mixer and consisting of acrylic acid, water, mercaptoethanol and hydrogen peroxide is sprayed through the one-material nozzle onto the initially taken polymer powder. An aqueous solution of 2,500 g/h of sodium hydroxide in 2,900 g/h of water is sprayed continuously on the agitated powder bed at another point of the reactor. This gives an 85% neutralized polyacrylic acid powder having a residual monomer content of less than 1%. The content of swollen particles in the polymer is less than 1%. The polymer has a K value of 40.2 and gives the sieve analysis results shown in the Table. As can be seen from this, polymers having coarser particles result.

COMPARATIVE EXAMPLE 2

Comparative Example 1 is repeated with the sole exception that the distance from the nozzle end, through which the monomer stream is sprayed onto the powder, to the powder surface is 4 cm. The polymer having a K value of 39.8 and the particle size distribution stated in the Table is obtained.

TABLE

| Polymer prepared according to Example No. | Mesh size [mm] of sieve | | | | | | |
|---|---|---|---|---|---|---|---|
| | <1 | 1-2 | 2-2.5 | 2.5-3.15 | 3.15-4 | <4 | <0.1 |
| 1 | 16.4 | 67.4 | 7.6 | 4.6 | 2.1 | 1.8 | 0.1 |
| 2 | 6.6 | 69.4 | 14.0 | 6.3 | 2.3 | 1.0 | 0.1 |
| 3 | 27.0 | 60.1 | 10.9 | 0.6 | 0.9 | 0.5 | 0.0 |
| Comparative Example No. | | | | | | | |
| 1 | 1.7 | 11.2 | 26.6 | 45.6 | 10.7 | 4.1 | 0.1 |
| 2 | 3.0 | 25.5 | 39.0 | 22.5 | 8.4 | 1.5 | 0.1 |

As can be seen from the Table, the novel process gives powder polymers having a substantially narrower particle size distribution than those obtained by the known polymerization process in a powder bed. Moreover, the amount of dust produced in the novel process is subtantially smaller than in the procedures described to date.

We claim:

1. A method for controlling the particle size in the preparation of hydrophilic polymer powders by polymerization of water-soluble monoethylenically unsaturated monomers in a powder bed in the presence of a polymerization initiator and an inert auxiliary liquid while maintaining the powder state, removing the heat of polymerization by distilling off the auxiliary liquid and circulating the reaction material, which comprises dividing a solution of the monomers in the inert auxiliary liquid into fine drops with the aid of a multimaterial nozzle which dips into the powder bed, and an inert gas stream, and regulating the particle size of the resulting polymer powder by varying the amount of inert gas in the range from 10 to 100 l per l of monomer solution.

* * * * *